United States Patent
Ko et al.

(10) Patent No.: US 6,465,609 B2
(45) Date of Patent: Oct. 15, 2002

(54) PROCESS FOR REMOVAL OF METAL CATALYST FROM POLYMER SELECTIVELY HYDROGENATED USING ORGANOTITANIUM COMPOUND

(75) Inventors: YoungHoon Ko; HooChae Kim; JaeYun Kim; KyungHo Row; MyoungSeup So, all of Taejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 09/930,649

(22) Filed: Aug. 15, 2001

(65) Prior Publication Data

US 2002/0099149 A1 Jul. 25, 2002

(30) Foreign Application Priority Data

Nov. 28, 2000 (KR) .............................. 00-71204

(51) Int. Cl.$^7$ .................................. C08F 6/08
(52) U.S. Cl. ........................ 528/490; 528/495; 528/496; 528/499; 528/502 D; 525/338
(58) Field of Search ................ 528/487, 490, 528/495, 496, 502 D; 525/370, 338

(56) References Cited

U.S. PATENT DOCUMENTS

| | | | |
|---|---|---|---|
| 3,494,942 A | 2/1970 | Miki et al. ............... | 260/397.5 |
| 3,531,448 A | 9/1970 | Johnson .................. | 260/85.1 |
| 3,670,054 A | 6/1972 | De La Mare et al. ..... | 260/880 |
| 3,700,633 A | 10/1972 | Wald et al. .............. | 260/880 |
| 4,501,857 A | 2/1985 | Kishimoto et al. ........ | 525/338 |
| 4,595,749 A | 6/1986 | Hoxmeier ................ | 528/483 |
| 4,673,714 A | 6/1987 | Kishimoto et al. ........ | 525/314 |
| 4,980,421 A | 12/1990 | Teramoto et al. ......... | 525/338 |
| 5,039,755 A | 8/1991 | Chamberlain et al. ..... | 525/338 |
| 5,089,541 A | 2/1992 | Madgavkar et al. ....... | 523/310 |
| 5,104,972 A | 4/1992 | Madgavkar et al. ....... | 528/488 |
| 5,242,961 A | 9/1993 | Chamberlain et al. ..... | 524/147 |
| 5,242,986 A | 9/1993 | Gibler et al. ............ | 525/332.8 |
| 5,583,185 A | 12/1996 | Parellada Ferrer et al. . | 525/338 |
| 5,753,778 A | 5/1998 | Ko et al. ................ | 525/339 |
| 5,910,566 A | 6/1999 | Ko et al. ................ | 528/480 |
| 6,020,439 A | 2/2000 | Ko et al. ................ | 525/338 |
| 6,040,390 A | 3/2000 | Ko et al. ................ | 525/338 |
| H1956 H * | 4/2001 | Schisla et al. ........... | 525/338 |

FOREIGN PATENT DOCUMENTS

WO    0008069    2/2000

* cited by examiner

*Primary Examiner*—Fred Teskin
(74) *Attorney, Agent, or Firm*—Davidson, Davidson & Kappel, LLC

(57) ABSTRACT

The present invention provides an effective process for removal of the residual metal catalyst from a polymer solution using water and alcohol containing an inorganic acid after selective hydrogenation of the unsaturated olefinic double bonds in a polymer of a conjugated diene monomer or a copolymer of a conjugated diene monomer and an aromatic vinyl monomer in the presence of a homogeneous organotitanium catalyst, which is an economical and simple process especially for the purpose of an industrial use for effectively removing the residual titanium compounds and lithium salts from the hydrogenated polymer solution.

13 Claims, No Drawings

PROCESS FOR REMOVAL OF METAL CATALYST FROM POLYMER SELECTIVELY HYDROGENATED USING ORGANOTITANIUM COMPOUND

BACKGROUND OF THE INVENTION

1. Field of the Invention

The present invention relates to a process for removal of a residual catalyst from a polymer solution after selective hydrogenation of unsaturated double bonds in a conjugated diene polymer using a homogeneous organotitanium compound as a catalyst.

2. Description of the Related Art

Polymers of a conjugated diene monomer such as 1,3-butadiene or isoprene, or copolymers of a conjugated diene and a vinyl aromatic monomer such as styrene are widely used as an elastomer.

Block copolymers of conjugated diene and vinyl aromatic monomer are thermoplastic elastomers that are used without being vulcanized as a modifier of impact-resistant transparent resin or polyolefin and polystyrene resin.

Polymers having olefinic unsaturated double bond cause problems in regard to stability including heat, acid or weather resistance due to the double bond. Hence, such polymers are to be applied in the limited range without exposure to the exterior.

In an attempt to overcome these problems and improve durability and oxidation resistance, an approach is the partial or complete saturation of the double bond in the polymers with hydrogen.

The hydrogenation methods for those polymers that have olefinic double bond are already disclosed in many related documents and largely classified into two methods: the one method is using a heterogeneous catalyst and the other is using a Ziegler catalyst or a homogenous catalyst comprising an organometallic compound such as rhodium or titanium.

The hydrogenation method using a homogeneous catalyst provides high catalyst activity under mild conditions such as low temperature and low pressure and high yield with a small amount of the catalyst. Besides, such a hydrogenation method enables selective addition of hydrogen to the olefinic double bonds of the copolymer chain of vinyl aromatic hydrocarbon and conjugated diene other than the aromatic hydrocarbon moiety under proper hydrogenation conditions.

There are many known methods of hydrogenation using a homogeneous catalyst. For example, U.S. Pat. Nos. 3,494,942; 3,670,054; and 3,700,633 disclose hydrogenation methods using a catalyst comprising a metal compound of the VIII group, particularly, nickel or cobalt compounds in combination with a proper reducing agent such as aluminum alkyl. U.S. Pat. Nos. 4,501,857; 4,673,714; 4,980,421; 5,039,755; 5,242,986; 5,583,185; and 6,040,390 describe that a bis(cyclopentadienyl)titanium compound is used as a main catalyst in hydrogenating the unsaturated double bond of conjugated diene polymers.

U.S. Pat. Nos. 5,753,778; 5,910,566; and 6,020,439 and WO 00/08,069 also describe that a mono(cyclopentadienyl) titanium compound is used as a catalyst for hydrogenation of conjugated diene polymers.

The above-mentioned homogeneous catalysts may provide high degree of hydrogenation and high reproducibility with a small amount but difficult to remove residual catalyst after hydrogenation. Polymers obtained as the final product may take on different colors unless the residual catalyst is removed, which degrades the product.

To remove the problematic residual catalyst, for example, U.S. Pat. No. 4,595,749 chelates the catalyst of a metal compound of the VIII group including nickel with dicarboxylic acid, oxygen or peroxides such as hydrogen peroxide ($H_2O_2$); U.S. Pat. No. 5,104,972 adsorbs the oxidized metals with silicate; U.S. Pat. No. 5,089,541 adsorbs the oxygen-reactive nickel catalyst with active carbon; and U.S. Pat. No. 3,531,448 removes the nickel catalyst with ammonium phosphate.

In addition, U.S. Pat. No. 5,242,961 treats the polymer hydrogenated with a bis(cyclopentadienyl)titanium compound with water, peroxide or alcohol and adds a non-phenolic antioxidant to prevent discoloration of the polymer, which method cannot effectively remove the residual titanium compound from the polymer.

According to the related art, there is no method for effectively removing an organotitanium compound used as a catalyst in hydrogenation of a conjugated diene polymer. Thus there is a need for providing a process for effectively removing the catalyst from polymer in order to manufacture products with high quality of color.

SUMMARY OF THE INVENTION

Accordingly, the inventors of this invention have been studying the process for effective removal of titanium compounds and lithium salts remaining in a polymer solution, after hydrogenating the unsaturated double bonds of a conjugated diene polymer in the presence of a homogeneous catalyst comprising an organotitanium compound alone or in combination with a reducing agent, and finally discovered that addition of alcohol containing an inorganic acid and then water perfectly removes the residual metal catalyst subsequent to preparation of the hydrogenated polymer.

It is, therefore, an object of the present invention to provide a process for effectively removing a metal catalyst from a conjugated diene polymer hydrogenated in the presence of a homogeneous catalyst comprising an organotitanium compound alone or in combination with a reducing agent.

To achieve the above object of the present invention, there is provided a process for removal of a metal catalyst that includes (a) selectively hydrogenating the olefinic double bond in a polymer of a conjugated diene monomer or a copolymer of a conjugated diene monomer and an aromatic vinyl monomer in the presence of a catalyst comprising an organotitanium compound alone or in combination with a reducing agent; and (b) removing the hydrogenated polymer of the residual metal catalyst using an alcohol containing an inorganic acid, and then water.

Hereinafter, the present invention will be described in further detail as follows.

In the present invention, selective hydrogenation of the olefinic double bond of a conjugated diene compound is performed in the presence of a catalyst comprising an organotitanium compound alone or in combination with a reducing agent.

More specifically, the organotitanium compound of the main catalyst used in the hydrogenation reaction of the present invention is a mono(cyclopentadienyl)titanium compound or a bis(cyclopentadienyl)titanium compound, which is used alone or in combination with a reducing agent.

The hydrogenation reaction using such a catalyst is based on, if not specifically limited to, WO 00/08,069 and U.S. Pat.

Nos. 4,501,857; 4,673,714; 4,980,421; 5,753,778; 5,910,566; and 6,020,439.

Here, specific examples of the cyclopentadienyltitanium compound include cyclopentadienyltitanium halide compound, cyclopentadienyl(alkoxy)titanium halide compound, bis(cyclopentadienyl)titanium halide compound, bis(cyclopentadienyl)titanium dialkyl compound, bis (cyclopentadienyl)titanium diaryl compound, and bis (cyclopentadienyl)titanium dialkoxy compound.

Specific examples of the reducing agent usable together with the titanium catalyst include alkylaluminum compound, alkylmagnesium compound, organolithium compound, and metal hydride. The composition and the mixing ratio of the reducing agent with the titanium catalyst are to follow the method of the prior documents.

The amount of the hydrogenation catalyst used is preferably 0.01 to 20 mmol per 100 g of the polymer, more preferably 0.05 to 5 mmol per 100 g of the polymer.

The hydrogenation catalyst enables selective addition of hydrogen exclusively to the unsaturated double bond of the conjugated diene unit in the random, tapered or block copolymers of a conjugated diene polymer having a number average molecular weight (Mn) of 500 to 1,000,000 or a conjugated diene and a vinyl-substituted aromatic monomer.

The conjugated diene polymer is subjected to an anionic polymerization. The conjugated diene as used herein is a conjugated diene compound containing 4 to 12 carbon atoms, such as 1,3-butadiene, isoprene, piperylene, phenyl butadiene, 3,4-dimethyl-1,3-hexadiene, or 4,5-diethyl-1,3-octadiene, and preferably a conjugated diolefin containing 4 to 9 carbon atoms.

Specific examples of the vinyl aromatic hydrocarbon copolymerizable with the conjugated diene compound include styrene, alkyl-substituted styrene, alkoxy-substituted styrene, or vinyl aryl compounds such as 2-vinyl pyridine, 4-vinyl pyridine, vinyl naphthalene, or alkyl-substituted vinyl naphthalene.

The conjugated diene polymer is a living polymer prepared by polymerization or copolymerization of at least one compound selected from the group consisting of the above-mentioned conjugated diene compound and the vinyl aromatic compound copolymerization with the conjugated diene compound, in the presence of an organolithium compound as an initiator.

Preferably, the weight ratio of aromatic vinyl-based monomer to conjugated diene monomer is 0.5:9.5 to 9.5:0.5.

Specific examples of the organolithium compound added as an initiator include n-butyl lithium or s-butyl lithium.

The hydrogenation reaction of the present invention is carried out with a polymer obtained by polymerization of a conjugated diene in an inert solvent.

Here, the term "inert solvent" as used herein refers to a solvent not reactive to any reactants of polymerization or hydrogenation reaction. Specific examples of the inert solvent include aliphatic hydrocarbons such as n-pentane, n-hexane, n-heptane or n-octane; cyclic hydrocarbons such as cyclohexane or cycloheptane; and ethers such as diethylether or tetrahydrofuran, which solvents are used alone or in combination.

In the hydrogenation reaction of the present invention, the concentration of the polymer based on the solvent is 1 to 50 wt. %, preferably 5 to 25 wt. %.

The hydrogenation reaction of the present invention is performed in such a manner that a hydrogenation catalyst is added to a polymer solution maintained at a constant temperature in the atmosphere of an inert gas such as hydrogen, helium, argon or nitrogen with or without stirring and then a hydrogen gas is injected into the polymer solution with a constant pressure. Here, the amount of the catalyst used in the hydrogenation reaction is 0.05 to 5 mmol per 100 g of the polymer, temperature 50 to 140° C., pressure 2 to 30 kg/cm$^3$.

The present invention provides a process for removal of an inactive titanium catalyst from the polymer solution after the completion of hydrogenation in such a manner as described above. More specifically, a mixed solution of inorganic acid and alcohol is vigorously mixed with the polymer solution to extract out the titanium catalyst into the alcohol phase from the polymer phase and the alcohol layer containing the titanium catalyst is then separated from the mixed solution by using the gravity difference. Alternatively, instead of removing the alcohol layer, water is added to the mixed solution to cause a phase separation and dissolve alcohol and lithium salts remaining in the polymer solution into the water layer.

Here, specific examples of the inorganic acid include hydrochloric acid, nitric acid, sulfuric acid and phosphoric acid, and specific examples of the alcohol include methanol, ethanol, butanol, pentanol and 2-ethyl-1-hexanol. Any mixture of inorganic acid and alcohol may be used and a mixture of hydrochloric acid and methanol is preferable.

Preferably, the used amount of the inorganic acid is 1 to 1000 moles per 1 mole of the organotitanium compound used as a catalyst. The inorganic acid is mixed with the alcohol.

The mixing ratio of inorganic acid to alcohol is 1 to 50 v/v %, preferably 1 to 10 v/v %. If the mixing ratio of inorganic acid to alcohol exceeds the above range, an excess of waste acidic solution is produced, which is difficult to treat and problematic in the economical aspect.

The used amount of the alcohol including the inorganic acid is about 1/20 to 1/2 of the hydrogenated polymer solution in volume, preferably 1/10 to 1/4. If the used amount of the alcohol including the inorganic acid is less than 1/20 of the polymer solution in volume, it becomes difficult to remove the catalyst from the polymer solution. If exceeding 1/2, the polymer could be coagulated.

Subsequently, the added amount of water is about 1/20 to 1/2 of the polymer solution in volume, preferably 1/10 to 1/4. If the amount of water is less than 1/20 of the polymer solution in volume, the alcohol is difficult to extract from the polymer solution. If exceeding 1/2, an excess of waste water is produced with an economical problem.

The time for mixing the alcohol including the inorganic acid with the hydrogenated polymer solution is variable depending on the type or efficiency of the stirrer and preferably more than 1 hour. The separation of the mixed solution of alcohol and polymer or that of polymer solution and water is performed as a gravity separation or with a centrifuge or a counter current extractor.

DETAILED DESCRIPTION OF THE PREFERRED EMBODIMENTS

Hereinafter, the present invention will be described in detail by way of the following examples, which are not intended to limit the scope of the present invention.

EXAMPLE 1

Effect with Removal of Titanium and Lithium 2800 g of a solution containing 400 g of a polystyrene-polybutadiene-polystyrene block copolymer(styrene content 30%, butadiene content 70%, and number average molecular weight 50,000) obtained by anionic polymerization reaction was added to a 5ℓ autoclave reactor and heated to 60° C. at 400 rpm (revolutions per minute). After adding 12 mmol of lithium hydride to the polymer solution in the autoclave reactor and then 1.2 mmol of cyclopentadienyl(2,6-di-t-butyl-4-methyl phenoxy)titanium dichloride, hydrogenation reaction was performed with hydrogen pressure of 10 kg/cm$^3$. An NMR analysis of the polymer thus hydrogenated showed that more than 97% of the double bond in the polybutadiene block was saturated.

A mixture of hydrochloric acid and methanol (5 v/v % c-HCl/MeOH) was added to a mixer equipped with a stirrer to be 1/6 of the polymer solution in volume, followed by addition of the polymer solution. After being stirred vigorously for one hour, the mixed solution was kept for more than 12 hours to cause a phase separation and remove the methanol layer. Water being one quarter of the polymer solution in volume was then added to the polymer solution layer. After being stirred for 10 minutes and kept for more 30 minutes, the aqueous layer was removed.

The solvent was dried off from the resulting polymer solution by vacuum oven and the solidified polymer was analyzed in regard to the content of metal through an elemental analysis using inductively coupled plasma (ICP). Table 1 shows the contents of titanium and lithium before and after the catalyst removal process.

TABLE 1

|  | Before removal of catalyst | After removal of catalyst |
|---|---|---|
| Ti content (ppm) | 144 | 4.2 |
| Li content (ppm) | 208 | 9.7 |

EXAMPLE 2
Effect with Removal of Titanium 2800 g of a solution containing 400 g of the polystyrene-polybutadiene-polystyrene block copolymer obtained in Example 1 was added to a 5ℓ autoclave reactor and heated to 60° C. at 400 rpm. After adding 1.6 mmol of bis(cyclopentadienyl)di-p-tolyltitanium to the polymer solution, hydrogenation reaction was performed with hydrogen pressure of 10 kg/cm$^3$. An NMR analysis of the polymer thus hydrogenated showed that more than 97% of the double bond in the polybutadiene block was saturated.

The hydrogenated polymer solution was removed of the catalyst using HCl-containing methanol and water, and the content of metal in the polymer was measured in the same manner as described in Example 1. Table 2 shows the content of titanium before and after the catalyst removal process.

TABLE 2

|  | Before removal of catalyst | After removal of catalyst |
|---|---|---|
| Ti content (ppm) | 192 | 5.2 |

EXAMPLE 3
Effect with Improvement of Color

The hydrogenated polymer solution as obtained in Example 1 was removed of the solvent using steam and then water removed with a rolling mill at 150 to 160° C. From the polymer solution, a 2 mm thick sample specimen was prepared in a mold through hot press at 190° C. and measured in regard to CIE L*a*b* color and yellow index (YI) with a calorimeter to compare the colors before and after the catalyst removal process. An L* represents the value of color in the range from 0 to 100 (where 0 is the value of black color and 100 is the value of white color); a* being a value between −60 and 60 (where −60 is the value of green color and 60 is the value of red color); and b* being a value between −60 and 60 (where −60 is the value of blue color and 60 is the value of yellow color. Table 3 shows the L*a*b* color and YI values before and after the catalyst removal process.

TABLE 3

|  | Before removal of catalyst | After removal of catalyst |
|---|---|---|
| L* | 75.27 | 87.54 |
| a* | 0.32 | 0.28 |
| b* | 53.25 | 4.39 |
| YI | 32.32 | 2.02 |

EXAMPLE 4
Effect with Removal of Catalyst Depending on Used Amount of HCl

The polymerization and hydrogenation reactions were performed as described in Example 1 and the mixing ratio of methanol to hydrochloric acid was regulated in the catalyst removal process while the ratio of methanol to polymer solution was fixed at 1/6. The measured titanium content in the polymer solution is shown in Table 4.

TABLE 4

| | Before removal of catalyst | HCl (v/v %) in MeOH | | | | | |
|---|---|---|---|---|---|---|---|
| | | 2 | 3 | 4 | 5 | 6 | 7 |
| Ti (ppm) | 144 | 6.2 | 4.7 | 4.4 | 4.2 | 4.1 | 4.1 |

EXAMPLE 5
Effect with Removal of Catalyst Depending on Volume Ratio of Methanol to Polymer Solution The polymerization and hydrogenation reactions were performed as described in Example 1 and the ratio of methanol to polymer solution was regulated in the catalyst removal process while the mixing ratio of hydrochloric acid to methanol was fixed at 5 v/v %. The measured titanium content in the polymer solution is shown in Table 5.

TABLE 5

| | Before removal of catalyst | MeOH containing inorganic acid to polymer solution (v/v) | | | | | |
|---|---|---|---|---|---|---|---|
| | | 1/3 | 1/4 | 1/5 | 1/6 | 1/7 | 1/8 |
| Ti (ppm) | 144 | 4.0 | 4.0 | 4.1 | 4.2 | 4.8 | 5.7 |

As described above, the present invention provides an effective process for removal of the residual metal catalyst from a polymer solution using water and alcohol containing an inorganic acid after selective hydrogenation of the unsaturated olefinic double bonds in a polymer of a conjugated diene monomer or a copolymer of a conjugated diene monomer and an aromatic vinyl monomer in the presence of a homogeneous organotitanium catalyst, which is an economical and simple process especially for the purpose of an industrial use for effectively removing the residual titanium compounds and lithium salts from the hydrogenated polymer solution.

What is claimed is:

1. A method of removing metal catalyst from hydrogenated polymer obtained by selective hydrogenation method of olefinic double bonds in a polymer of a conjugated diene monomer or a copolymer of a conjugated diene monomer and an aromatic vinyl monomer in the presence of a catalyst comprising an organotitanium compound alone or in combination with a reducing agent, wherein the method of removing metal catalyst comprises (1) removing with or without removing an alcohol layer through separation after adding alcohol containing 1 to 10 v/v % of HCl an amount of 1/2 to 1/20 in volume ratio with respect to the hydrogenated polymer, (2) removing with a water layer through separation after adding water an amount of 1/2 to 1/20 in volume ratio with respect to the hydrogenated polymer.

2. The method of removing as claimed in claim 1, wherein the alcohol is at least one selected from the group consisting of methanol, ethanol, propanol, butanol and 2-ethyl-1-hexanol.

3. The method of removing as claimed in claim 1, wherein the alcohol is methanol.

4. The method of removing as claimed in claim 1, wherein the HCl is mixed in an amount of 1 to 50 v/v % with respect to the alcohol.

5. The method of removing as claimed in claim 1, wherein (1) separation of the alcohol layer from the hydrogenated polymer is performed selectively using gravity separation or a centrifuge or a counter current extractor.

6. The method of removing as claimed in claim 1, wherein (2) separation of the water layer is performed selectively using gravity separation or a centrifuge or a counter current extractor.

7. The method of removing as claimed in claim 1, wherein the conjugated diene monomer is 1,3-butadiene or isoprene.

8. The method of removing as claimed in claim 1, wherein the aromatic vinyl monomer is styrene or a-methyl styrene.

9. The method of removing as claimed in claim 1, wherein the organotitanium compound is a mono(cyclopentadienyl) titanium compound or a bis(cyclopentadienyl)titanium compound.

10. The method of removing as claimed in claim 1, wherein the metal catalyst is used in an amount of 0.05 to 5 mmol per 100 g of the polymer.

11. The method of removing as claimed in claim 1, wherein the polymer of the conjugated diene monomer or the copolymer of the conjugated diene monomer and the aromatic vinyl monomer has a number average molecular weight (Mn) of 500 to 1,000,000.

12. The method of removing as claimed in claim 1, wherein the polymer has concentration of 2 to 25 wt %.

13. The method of removing as claimed in claim 1, wherein the reducing agents are alkyl aluminum, alkyl magnesium, organolithium and metal hydride.

* * * * *